Nov. 29, 1955          A. C. WINTEMBERG          2,725,018
RAILWAY MOTOR TRUCK
Filed Jan. 5, 1952

Inventor
Adelbert C. Wintemberg
By Rodney Bedell
Atty.

United States Patent Office 2,725,018
Patented Nov. 29, 1955

2,725,018
RAILWAY MOTOR TRUCK

Adelbert C. Wintemberg, Drexel Hill, Pa., assignor to General Steel Castings Corporation, Granite City, Ill., a corporation of Delaware Application January 5, 1952, Serial No. 265,100

9 Claims. (Cl. 105—139)

The invention relates to railway rolling stock and more particularly to motor trucks of the type in which a motor and its housing is partially supported upon a wheel and axle assembly and is partly supported upon the transverse transom of a truck frame carried by the wheel and axle assemblies.

Locomotives used on light rails usually have four-wheel, two-motor trucks and a length designed to accommodate equipment in the cab and to provide space between the trucks sufficient to accommodate the main air reservoir, fuel tank, battery box and other equipment suspended from the cab underframe. When it is desired to use six-wheel motor trucks for similar locomotives and it is required that the weight upon each pair of driver wheels be held to a minimum, it may be necessary to use three motors per truck. Also, to keep the length of the locomotive to a minimum, it is necessary to design the six-wheel truck with a minimum wheel base.

To obtain the minimum wheel and axle spacing, more particularly at the end of the truck where the motor nose of the intermediate motor and of the end motor are adjacent to the same intermediate transom, there are clearance conditions to be considered, such as the clearance between motor safety lug and transom; clearance between motor nose and transom; clearance between motor nose and transom as the motor is moved into and out of assembled relation with its support when applied from above; clearance between motor nose suspension under working conditions and the application and removal of same laterally of the truck. All of these clearance conditions vary with the width of the transom plus normal casting variations and determines the wheel spacing.

The main object of the invention is to maintain a desired minimum wheel base which will not be increased because of the supporting of the motor housings on the truck frame transoms.

Another object is to facilitate application and removal of the motors from the truck for replacement or repair.

Another object is to construct a truck frame of a one piece casting which will be effective and not difficult to cast.

These and other detailed objects as will be indicated, are attained by the structure illustrated in the accompanying drawings, in which Figure 1 is a top view of a major portion of a six wheel truck with a part sectioned on the line 1—1 of Figure 2.

Figure 1:
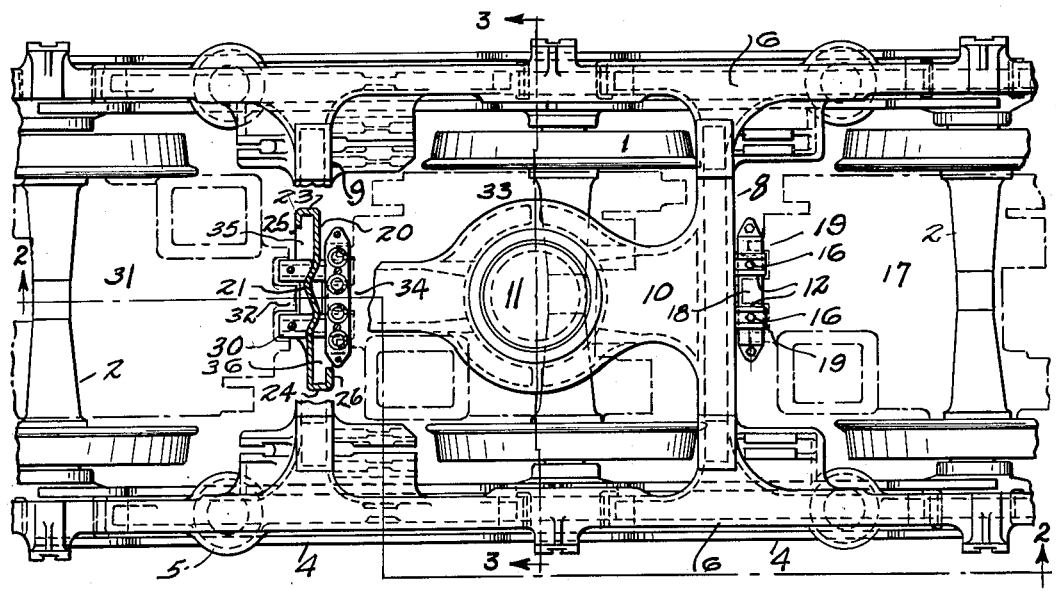
Figure 2:
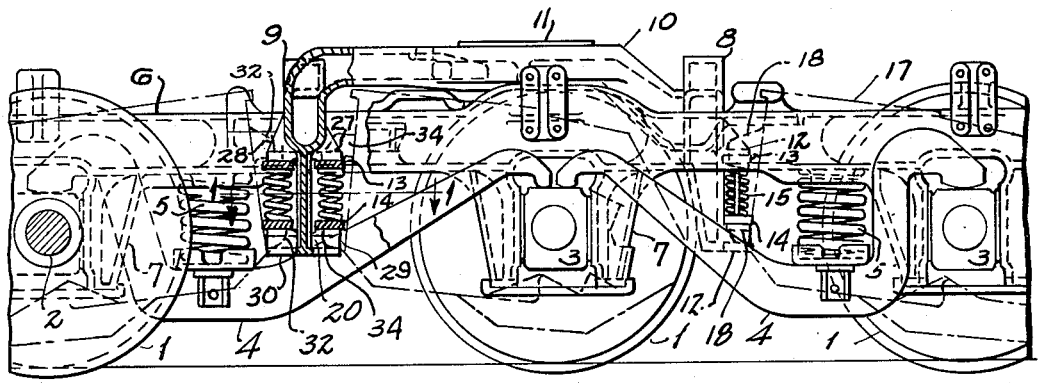
Figure 2 is in part a side view and in part a longitudinal vertical section and is taken on the line 2—2 of Figure 1.
Figure 3:
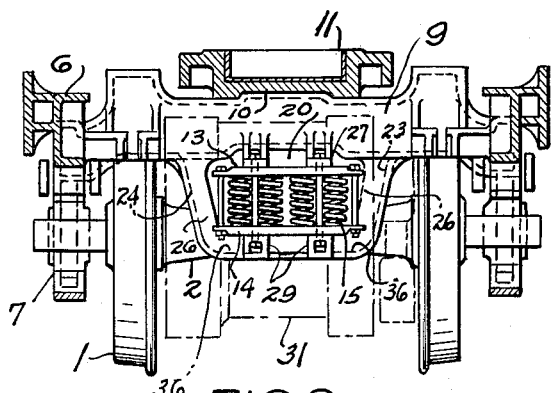
Figure 3 is a vertical transverse section taken on the transverse center line of the truck.

The truck includes the usual assemblies of wheels 1, axles 2, journal boxes 3, drop equalizers 4, and equalizer springs 5. A truck frame is mounted on springs 5 and includes wheel pieces or side members 6 of channel section with integral depending pedestals 7 for receiving journal boxes 3.

Transverse transoms 8 and 9 extend from wheel piece to wheel piece and are connected by a central longitudinal member 10 which mounts the load carrying center plate 11.

Transom 8 is box section from end to end and from top to bottom, its middle portion being substantially deeper than its end portions and provided with integral brackets 12 spaced vertically, which receive between them a motor suspension unit comprising upper and lower bars 13 and 14 with intervening coil springs 15 and tie bolts 16. A driver motor 17 mounted on the right hand end axle 2 has a housing with noses 18 engaging bars 13 and 14 and safety lugs 19 overlying bar 13. This is a common motor and transom connection structure.

Transom 9 has a box shape upper portion extending from wheel piece to wheel piece but which is shallow in comparison with transom 8. Intermediate the ends of the transom a plate section 20 depends from the bottom wall of the box section and preferably is corrugated vertically throughout its depth as indicated at 21. The ends of the plate section are provided with flanges 23, 24 respectively extending lengthwise of the truck and having rebent terminals 25, 26 respectively extending towards the longitudinal center line of the truck and parallel to plate section 20. Preferably, flange 23 projects from one side of plate section 20 and flange 24 projects from the opposite side of plate section 20. The lower ends of flanges 23, 24 merge with horizontal flanges 35, 36 respectively, and extend between the lower spring suspension support lugs and reinforce the lower end of web 20 but are not wide enough to interfere with the swinging of the lower nose of the motor into and out of position when the spring suspension device is to be removed.

Brackets 27, 28 are formed integrally with box section 9 and plate section 20 and extend from the transom in opposite directions longitudinally of the truck and correspond to upper brackets 12. Brackets 29, 30, similarly extend from plate section 20 in opposite directions longitudinally of the truck and correspond to lower brackets 12.

Motor suspension units, as previously described, are mounted between the upper and lower brackets at each side of the transom. A motor 31 on the left-hand end axle has housing noses 32 engaging the corresponding suspension unit. A motor 33 on the middle axle has housing noses 34 similarly engaging the corresponding suspension unit.

With this construction the motor noses 32 and 34 may approach each other more closely than would be possible if the lower portion of transom 9 were box shaped as is transom 8. Consequently, the distance between the middle axle and the left-hand axle does not need to be increased because of the mounting of their respective motors upon the single transom 9. At the same time, the transom possesses the strength resulting from its extension longitudinally of the truck by corrugations 21 and its flanges 23, 24.

In effect, the motor noses 32, 34 and their suspension units are located partially within the transom but each suspension may be removed for replacement or repair by movement laterally of the truck away from the adjacent flange, aligned with the nose transversely of the truck, and in a direction parallel to the plate section, the same as the suspension unit for motor 17.

The details of the structure may be varied without departing from the spirit of the invention and the exclusive use of those modifications coming within the scope of the claims is contemplated.

What is claimed is:

1. In a railway motor truck, a wheel and axle assembly, a truck frame supported therefrom and including wheel pieces and transverse transom spaced longitudinally of the truck from said assembly and having a wide upper portion extending from wheel piece to wheel piece, and a plate section depending therefrom and provided with an upright flange at one of its ends only projecting in one direction transversely of the plate section, an upwardly facing bracket projecting in the same direction from said plate section, a motor suspension unit mounted on said bracket and in substantial alinement transversely of the truck with said flange and being removable from the transom in the direction leading away from said flange towards the other side of the truck, and a motor mounted on said assembly and having a nose supported on said unit and extending lengthwise of the truck alongside said upright flange.

2. In a railway motor truck, spaced wheel and axle assemblies, a truck frame supported therefrom and including wheel pieces and a transverse transom having a wide upper portion, extending from wheel piece to wheel piece intermediate said assemblies, and a plate section depending therefrom and provided with an upright flange at each end projecting transversely of the plate section, upwardly facing brackets extending laterally from both sides of said plate section, a motor spring suspension unit mounted on each of said brackets and opposing one of said flanges transversely of the truck and being movable from the transom in a direction parallel to said plate section and away from the opposing flange, and a motor mounted on each of said assemblies, each motor having a housing nose supported upon a corresponding spring suspension unit.

3. A railway truck frame including side members and a transverse transom having a relatively wide upper portion extending between said side members, and a lower portion of relatively narrow upright plate section depending from said wide upper portion and having a flange at each end extending substantially from top to bottom of the plate section, one of said flanges projecting from one side of the plate section and the other of said flanges projecting from the other side of the plate section, there being motor supporting lugs projecting from the lower center portion of the plate section intermediate said flanges.

4. A railway truck frame transom comprising a relatively wide upper portion extending from end to end of the transom, and a lower portion of plate section depending from said upper portion and having a flange at each end extending substantially throughout the depth of the plate section, one of said flanges projecting from one side of the plate section and the other of said flanges projecting from the other side of the plate section, a pair of motor supporting lugs projecting laterally from each side of the lower portion of the plate section, the lower part of the flange at each end of the plate extending inwardly from the end of the plate section and along the bottom and merging with the nearest motor supporting lug.

5. A railway truck frame transom comprising a relatively wide upper portion from end to end, a lower portion of plate section depending from said upper portion and having vertical corrugations substantially throughout its depth and intermediate its ends, motor supporting brackets extending from said plate section transversely of the transom, and reinforced flanges at the ends of said plate section, the flange at one end of the plate section extending transversely of the transom in one direction and the reinforcing flange at the other end of the plate section extending transversely of the transom in the opposite direction.

6. A railway truck frame transom as described in claim 4 in which each pair of motor-supporting lugs are spaced apart lengthwise of the transom, there being a horizontal flange at each side of the plate section extending between the corresponding lugs.

7. A railway truck frame transom as described in claim 3 which also includes motor-engaging lugs projecting from the upper portion of the plate section above the motor-supporting lugs.

8. A railway truck frame intermediate transom comprising a relatively wide box section upper portion, a plate section integral with said box section and depending from substantially the longitudinal center portion of the bottom wall thereof, said plate having a thickness less than the cross section of said box section whereby each of its side faces is spaced inwardly of the adjacent side face of said box section, said plate section being of reduced length relative to said box section whereby each of its ends are spaced inwardly from the adjacent ends thereof, and a flange formed on each end margin of said plate section, said flanges extending in opposite directions so that each end face of said plate is provided with a single flange.

9. A railway truck frame intermediate transom comprising a relatively wide box section upper portion, a plate section integral with said box section and depending from substantially the longitudinal center portion of the bottom wall thereof, said plate having a thickness less than the cross section of said box section whereby each of its side faces is spaced inwardly of the adjacent side face of said box section, said plate section being of reduced length relative to said box section whereby each of its ends are spaced inwardly from the adjacent ends thereof, an upright flange provided on each end margin of said plate section, each upright flange projecting from a side face of said plate and in opposite directions to each other, a horizontal flange provided on each side face of said plate section and projecting from the bottom margin thereof, each horizontal flange merges on one of its ends with the upright flange projecting from the same side face of said plate section and each terminates at its other end spacedly from the opposite end margin of the plate section.

References Cited in the file of this patent

UNITED STATES PATENTS

| Number | Name | Date |
|---|---|---|
| 556,654 | Adams | Mar. 17, 1896 |
| 787,944 | Price | Apr. 25, 1905 |
| 1,397,472 | Wallace | Nov. 15, 1921 |
| 1,650,069 | Hallquist | Nov. 22, 1927 |

FOREIGN PATENTS

| Number | Country | Date |
|---|---|---|
| 326,550 | Germany | Sept. 29, 1920 |